United States Patent [19]

Husted

[11] 4,129,193
[45] Dec. 12, 1978

[54] PROPULSION SYSTEM FOR A SNOW GOING DEVICE

[75] Inventor: Royce H. Husted, Wheaton, Ill.

[73] Assignee: Saroy Engineering, Wheaton, Ill.

[21] Appl. No.: 793,728

[22] Filed: May 4, 1977

[51] Int. Cl.² .................................................. B62M 27/00
[52] U.S. Cl. .................................. 180/5 R; 280/11.11 E
[58] Field of Search ................ 280/11.11 E, 11.11 R, 280/21 R; 180/1 G, 5 R

[56] References Cited

U.S. PATENT DOCUMENTS

| | | | |
|---|---|---|---|
| 3,853,192 | 12/1974 | Husted | 280/11.11 E |
| 3,931,862 | 1/1976 | Cote | 180/5 R |
| 4,036,320 | 7/1977 | Rabehl | 180/5 R |

*Primary Examiner*—Richard A. Bertsch
*Attorney, Agent, or Firm*—Samuel Shiber

[57] ABSTRACT

A propulsion system for a snow going device having a tread circulateably supported around an elongated body with skirt means on each side and extending below the elongated body for protecting the tread and improving the traction.

6 Claims, 5 Drawing Figures

PROPULSION SYSTEM FOR A SNOW GOING DEVICE

BACKGROUND OF THE INVENTION

A power driven ski-bob and ski are newcomers to the field of winter recreation. Presently there is a polarization between outdoors winter sports enthusiasts. The purists adhere to skis propelled by gravity or skier's muscles, while the modernists enjoy mounting a snowmobile which employs brute force to propell itself and its riders. Power driven ski devices (shown in U.S. Pat. Nos. 3,853,192, 3,966,010 and co-pending U.S. patent application Ser. No. 754,457 which are herein incorporated by reference), bridge this gap between the purists and modernists. They do so by combining the excitement of using one's sense of balance to control and steer with the excitement of controlling one's propelling power, and they remove or reduce the objectionable aspects of snowmobiling. For example, the total weight of a current power driven ski-bob is around 30 pounds and it is propelled by a gas thrifty 3 HP engine, versus a snowmobile which weighs several hundreds of pounds and uses a gas guzzling engine ten times more powerful. Therefore, in contrast to snowmobiles, power driven ski-bobs and skis have a minimal effect on the trail they pass, they do not develop large kinetic energy that may endanger their rider and others and they are not likely to get stuck in the snow, since the average rider can lift a unit in one hand. The small engine generates less acustical energy which can be readily muffled to non-obtrusive levels. Further, power driven ski-bobs and skis are characterized by their long and narrow footprints, and have no stability of their own. Thus, the rider has to continuously maintain balance, which makes riding an involving and exciting experience.

At this point it may be helpful to briefly discuss some of the relationships between the tread's effectiveness to the weight and power of a snow going device:

When a propulsion system is less effective in engaging snow and developing thrust against it, it has to be made to cover a larger area, which in turn requires a larger engine and chasis, which in turn require an increased thrust to be moved, especially uphill. In addition, a bulky tread requires a substantial power just to be circulated in the snow. Thus, the present snowmobile weighs and requires as much power as it does. In contrast, it is an object of the present invention to provide a light, compact and effective propulsion system that would effectively translate the power of a small engine to thrust and enable the construction of light snow going devices such as power driven ski-bob and ski weighing as little as 30 and 15 pounds respectively.

Another aspect of designing a snow going device is that snow can be anything from rock hard to a fluffy powder, it can be a fraction of an inch or several feet deep. In addition the coefficient of friction between the same snow and the same ski runner surface may increase ten fold with temperature drop (Please refer to an article entitled "Properties of Snow" published in "Cold Regions Science and Engineering", December 1964, by Mr. Malcolm Mellor of the U.S. Army Material Command, Cold Regions Research & Engineering Laboratory, Hanover, N.H., for further data on coefficient of friction between snow and typical ski runner materials and wax coatings). Thus, present snowmobiles require several square feet of contact area between the tread and the snow and a large engine coupled to it, usually through a transmission, to adapt to the extreme conditions that combinations of these factors can produce. In contrast, it is an object of the present invention to obtain sufficient traction to propel one or two people uphill, over various snow conditions, with a compact propulsion system having a contact area with the snow as small as ½ a square foot.

SUMMARY OF THE INVENTION

The present invention relates to snow going devices and vehicles, and particularly to a power driven ski-bob and a ski shown in my proviously mentioned patents and patent application.

Specifically, the present invetion shows a propulsion system which is compact, light, effective and durable, and which meets the objects previously discussed. For example, an existing propulsion system constructed according to the present invention effectively translates the power output of a small 3 HP gasoline engine weighing less than 6 pounds to a thrust sufficient to propel two riders on a ski-bob uphill or on a flat terrain at speeds of to 25 m.p.h.. The total weight of this propulsion system is less than 4 pounds including a tread, an elongated body, shafts, sprockets etc..

The propulsion system comprises a tread, preferably of the type shown in my U.S. Pat. No. 4,035,035 which is herein incorporated by reference, circulateably supported around an elongated body. Skirt means on each side and extending below the body adapted to sink into soft snow and prevent the snow engaged by the tread from escaping transversely, while the elongated body does so from above, so that the snow is held in place while the tread develops thrust against it. This feature is extremely important in soft snow which has little firmness of its own and tends to escape transversely when pushed by a relatively small and narrow cleat. With an increased firmness of the snow the rails sink less and over hard snow the rails are adapted to raise the elongated body above the snow, forming a space between the elongated body and the snow. In this space the cleats can bend without becoming overstressed. In addition the rails essentially relieve the tread from supporting the elongated body while moving relative to it, thereby reducing friction inbetween. Consequently, the skirt means also protect the cleats from self destruction by bending sharply and wearing prematurely when the propulsion system travels accidentally over a tree stump for example, or when it travels over hard or thin snow.

Thus, the skirt means automatically adapt and assist the propulsion system to operate in various snow conditions previously discussed while at the same time protecting the tread from being overstressed and torn by hard surfaces and objects.

DETAILED DESCRIPTION OF THE FIGURES

Figure 4:
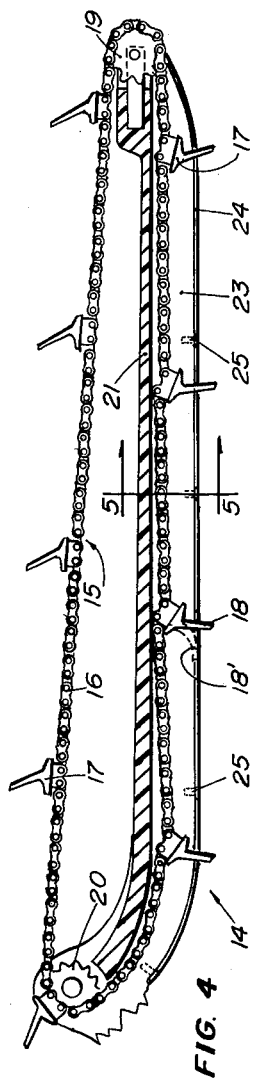
FIG. 4 shows a sectional side view of a propulsion system.
Figure 1:
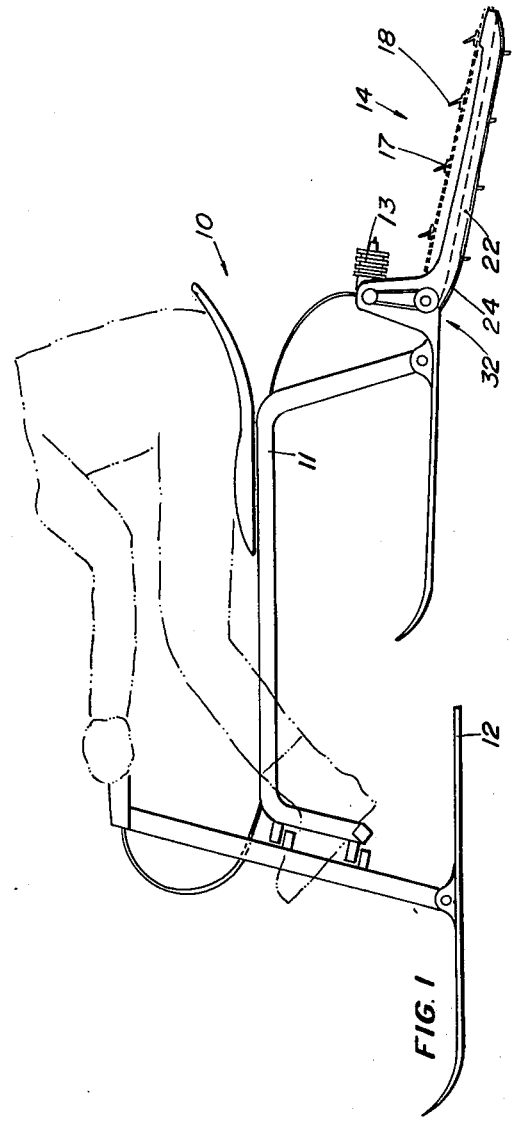
FIGS. 1, 2 and 3 respectively show side, bottom and front views of a power driver ski-bob equipped with a propulsion system according to the present invention.
Figure 2:
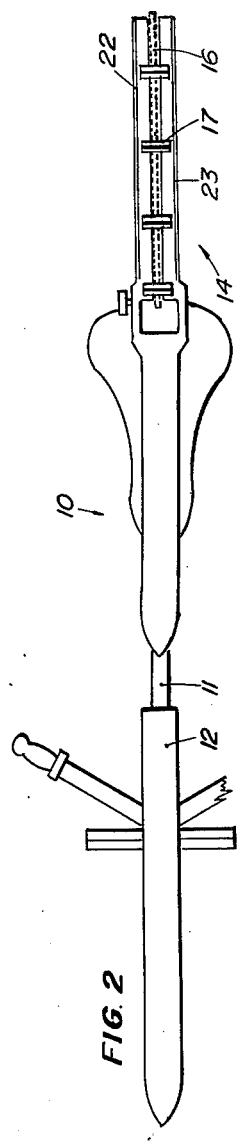
Figure 5:
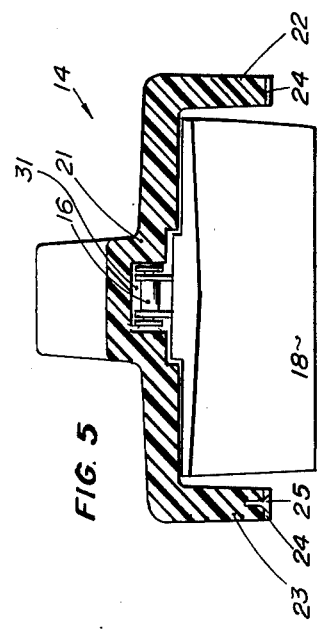
FIG. 5 shows a sectional view of the propulsion system along line 5—5 marked on FIG. 4.
Figure 3:
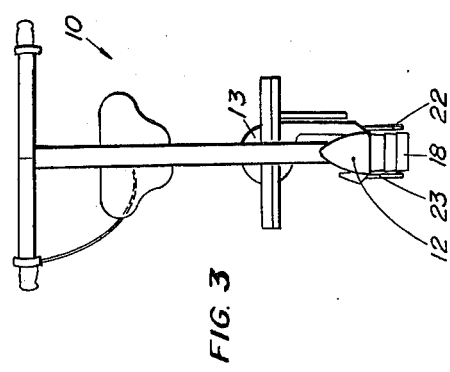

FIGS. 1, 2 and 3 show the general outlines of a power driven ski-bob 10 (same parts will be indicated with same numerals throughout the various FIGS.) having a frame 11 supported by a front steerable ski 12 and a power driven ski 32 having an engine 13 and a propulsion system 14. Referring now also to FIGS. 4 & 5, the propulsion system comprises a tread 15 having a tension carrying member in the form of a roller chain 16 carrying a plurality of cleats 17 having a protruding portion 18 made of a resilient material. The tread 15 is circulateably supported by idler and drive sprockets 19 and 20, respectively, around an alongated body 21. Skirt means 22 and 23 on each side and extending below the elongated body are adapted to sink in soft snow and allow the cleat 17 to fully engage the snow while preventing the snow from escaping transversely away from the cleat 17. On a hard snow rails 24 on the bottom of the skirt means slidingly support and raise the elongated body 21 above the snow forming a space inbetween, where the protruding portion 18 bends smoothly without becoming overstressed, as shown in FIG. 4 in a dashed line and indicated by numeral 18'. Thus, on a hard terrain such as hard snow, or thin snow over hard ground, the rails 24 slidingly support most of the weight carried through the propulsion system 14 which otherwise would have been supported through the tread 15, and specifically through the cleats 17, causing them to severely rub against the elongated body 21 and wear prematurely, and causing their protruding portion 18 to assume a sharp bend and become overstressed. The rails 24 are preferably made of metal and are attached with screws 25 to the bottom surface of the skirt means 22 and 23. The rails 24 serve as wear surfaces and as reinforcement to the skirt means. When the skirt means 22 and 23 are made of a suitable material their bottoms can serve as rails instead of the rails 24, simplifying the construction of the propulsion system.

The skirt means 22 and 23 can be affixed mechanically to the elongated body 21, however, preferably they are formed in unison with it to form what in general terms can be referred to as a U-shape channel which increases the section modulus of the elongated body as shown in FIG. 5. Consequently, the skirt means 22 and 23 allow an overall reduction in the amount of material used to form the elongated body 21.

At this point, noting some of the materials used in the propulsion system 14, and some dimensional relationships, may be helpful. The roller chain 16 is made of a heat treated high carbon steel. The resilient parts of the cleat 17 are made of polyurethane having a Shore hardness of 45 on a "D" scale. The elongated body 21 is made of Nylon reinforced with fiber-glass. The roller chain 16 is ½ inch wide and the cleat 17 is 3 inches wide. The elongated body 21 is 2 feet long and its cross-section (shown in FIG. 5) is formed to accomodate loosly the cleat 17 between the skirt means 22 and 23, and to accomodate in a closer fit the roller chain 16 in a special groove 31. The rails 24 are ⅜ of an inch wide.

It should be understood that the above details are given to illustrate the invention, but not to limit it, and that various modifications and substitutions can be made in the propulsion system without departing from the spirit of the invention or the scope of the claims. For example: when using the invention to propel a power driven ski, traction may be ample and weight may be a critical design consideration. Therefore the skirt means 22 and 23 may be perforated to the extent that their only function is to hold the rails 24. When propelling heavier snow going vehicles or devices the propulsion unit can be made longer and wider and a plurality of threads can be used, one alongside the other.

I claim:

1. A propulsion system for a snow going device, comprising in combination a propulsion tread circulateably supported around an elongated body, and skirt means, on each side and extending below side elongated body, said skirt means adapted to serve as protective rails for said tread and for slidingly supporting said propulsion system over hard terrain.

2. A propulsion system as in claim 1, wherein said skirt means prevent snow with which said tread is engaged from escaping transversly.

3. A propulsion system as in claim 1, wherein said tread has protruding portions, and said skirt means adapted to sink in soft snow and allow said protruding portions to fully engage with snow and to rise over hard terrain forming space between said elongated body and said hard terrain to prevent said tread from fully supporting said propulsion system.

4. A propulsion system as in claim 1, wherein said elongated body is molded in unison with said skirt means, forming together with it a U-shape channel.

5. A propulsion system for a snow going device comprising in combination a propulsion tread having at least one tension carrying member and a plurality of cleats attached thereto, said tread circulateably supported around an elongated body, roof means provided by said elongated body to prevent snow engaged by said cleats from escaping upwards, and skirt means on each side and extending below said elongated body adapted to serve as protective rails.

6. A propulsion system as in claim 5, wherein said skirt means prevent snow with which said tread is engaged from escaping transversly.

* * * * *